United States Patent [19]

Schwaiger et al.

[11] Patent Number: 4,856,753

[45] Date of Patent: Aug. 15, 1989

[54] DIE MOLD FOR THE PRODUCTION OF INJECTION MOLDED PRODUCTS AND HAVING IMPROVED CLOSURE MEMBER FOR CLOSING A RING-RECEIVING RECESS

[75] Inventors: Ernst Schwaiger; Erich Mitteregger, both of Micheldorf, Austria

[73] Assignee: IFW-Manfred Otte Gesellschaft m.b.H. & Co. KG., Micheldorf, Austria

[21] Appl. No.: 193,275

[22] Filed: May 11, 1988

[30] Foreign Application Priority Data

May 13, 1987 [AT] Austria ................................. 1207/87

[51] Int. Cl.⁴ ............................................. B29C 45/36
[52] U.S. Cl. ........................................ 249/94; 249/96; 249/98; 425/121; 425/124
[58] Field of Search ............... 425/110, 116, 121, 124; 249/83, 91, 93, 94, 96, 98, 144, 160

[56] References Cited

FOREIGN PATENT DOCUMENTS 362140  4/1981  Austria .

*Primary Examiner*—Jay H. Woo
*Assistant Examiner*—Timothy W. Heitbrink
*Attorney, Agent, or Firm*—Wenderoth, Lind & Ponack

[57] ABSTRACT

A die mold for the production of a fitting to be surrounded by a single-piece ring includes mold components separable along a plane extending parallel to the longitudinal axis of a fitting to be produced, the mold components having therein a recess into which is inserted the ring. A closure member closes the recess during molding and forms a wall of the die mold. The closure member is divided peripherally into plural portions each of which is of unitary and single-piece construction in a direction parallel to the longitudinal axis and which extends in such direction beyond at least one axial end of the recess.

3 Claims, 1 Drawing Sheet

DIE MOLD FOR THE PRODUCTION OF INJECTION MOLDED PRODUCTS AND HAVING IMPROVED CLOSURE MEMBER FOR CLOSING A RING-RECEIVING RECESS

BACKGROUND OF THE INVENTION

The present invention relates to a die mold for the production of injection molded products of thermoplastic synthetic material, particularly fittings, each fitting having a longitudinal axis and a flanged end, with a single-piece ring, particularly a ring-shaped flange, nonremovably mounted about the flanged end of the fitting. More particularly, the present invention relates to such a die mold including mold components separable along a plane extending parallel to the longitudinal axis of a fitting to be produced, the components having formed therein a recess into which is inserted the ring prepatory to and during a molding operation, and a closure member for closing such recess, the closure member being divided around the periphery thereof into plural portions and the closure member forming a wall of the die mold in the closed position of the mold components.

A fitting made of a synthetic material generally includes a pipe-shaped portion or element, on one end of which is formed a bulged portion defining a bead configured for fitting of a sealing ring, and the other end of which has a flange. In order to connect the flanged end of the fitting to a mounting or to another pipe-shaped element, there generally is provided an undivided ring-shaped flange fitted around the pipe element. In order to mount such single-piece ring-shaped flange about the fitting, it has been customary to heat the synthetic material so that the single-piece ring-shaped flange may be fit over the bulged end after compressing the same. However, in addition to the large amount of time and energy (heating of the fitting) required, this known procedure in most cases results in permanent deformation which has a very detrimental effect on the sealing of the fitting.

In order to avoid such disadvantages it has been proposed, as disclosed in Austrian Patent No. 362,140, to provide the mold components with a recess into which is fitted the single-piece ring and to close such recess during a molding operation by a closure member divided into separable portions around the periphery thereof. The closure member is inserted into the recess such that the inner surfaces of the plural portions of the closure member form a wall of the die mold in the closed position of the mold components. This arrangement however also provided that the closure member was divided axially of the longitudinal axis of the fitting to be produced, and this results in a complicated arrangement.

SUMMARY OF THE INVENTION

With the above discussion in mind, it is an object of the present invention to improve and simplify the construction of the arrangement shown in Austrian Patent No. 362,140, while retaining the functional advantages thereof. This is possible in accordance with the present invention by the realization that separation of the single-piece ring from the injection molded product does not necessarily require a closure member that is separable in a plane extending normal to the axis of the ring. Rather, the number of elements that are necessary to form the annular closure member that closes the recess containing the single-piece ring can be reduced by half if the closure member is divided peripherally into plural portions each of which is of unitary and single-piece construction in direction parallel to the longitudinal axis of the fitting to be molded and if each closure member portion extends in such direction beyond at least one axial end of the recess.

In accordance with specific embodiments of the present invention, the closure member portions can extend beyond both axial ends of the recess, or each closure member portion may include a projection extending radially outwardly into the recess. This latter arrangement particularly makes it easy to insert and remove the portions of the closure member.

BRIEF DESCRIPTION OF THE DRAWINGS

Other objects, features and advantages of the present invention will be apparent from the following description of preferred embodiments thereof, with reference to the accompanying drawings, wherein.

DETAILED DESCRIPTION OF THE INVENTION

Figure 1:
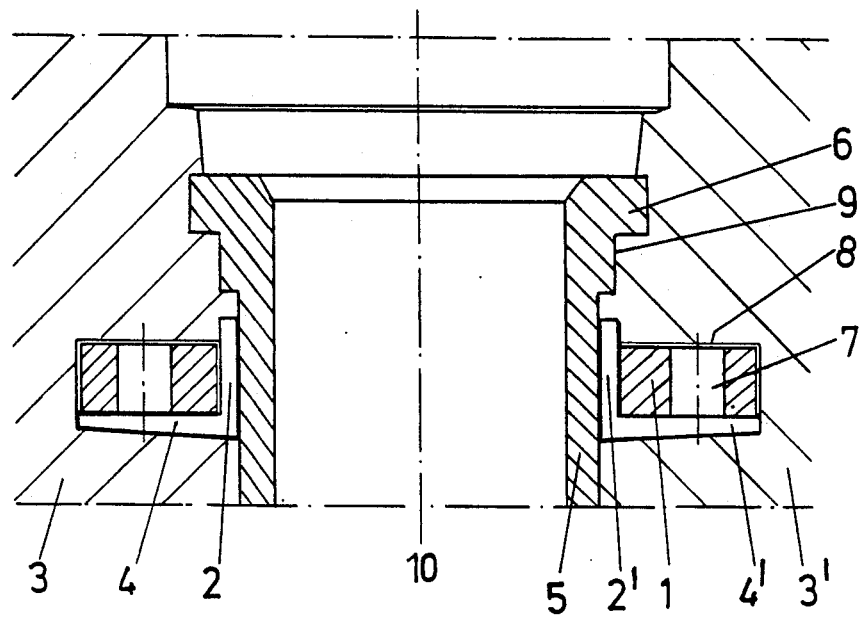
FIGS. 1 and 2 are longitudinal cross-sections of die molds according to two embodiments of the present invention.

As shown in the drawings, the injection molding device or die mold of the present invention includes two mold components 3, 3' separable along a plane extending parallel to and passing through a longitudinal axis 10 of a fitting 5 that is to be formed. The drawings show that the fitting 5 is to include at one end thereof a flange 6 and a connecting neck or surface 9 onto which is to be fit a ring-shaped flange 1 that is to be used to attach the fitting to a mounting or to another pipe by means of fastening holes 7.

Ring-shaped flange 1 fits within a recess 8, formed in mold components 3, 3', during molding of the fitting 5.

In order to isolate ring-shaped flange 1 from the material of fitting 5 during the production thereof, an annular closure member closes recess 8. The closure member is divided around the periphery thereof into a plurality of portions that form a wall of the die mold in the closed position of mold components 3, 3'. It is contemplated that the closure member may be divided into four such components, two of which 2, 2' are illustrated in the drawings. It is of course possible that the closure member may be peripherally divided into plural portions of a number other than four.

Figure 2:
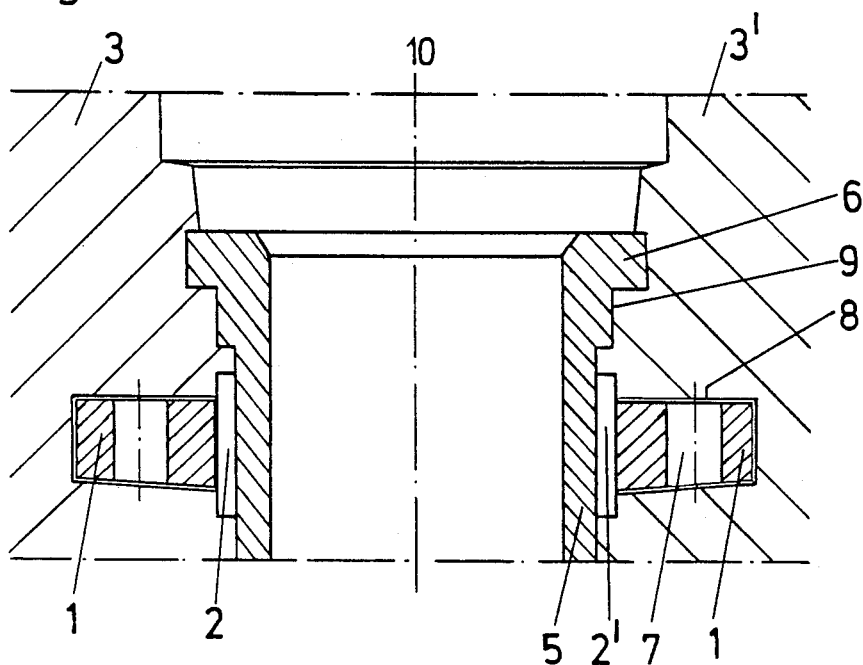

Each closure member portion 2, 2' is of unitary and single-piece construction in a direction parallel to longitudinal axis 10 and extends in such parallel direction beyond at least one axial end of recess 8. In the embodiment of FIG. 1, the closure member portions 2, 2' extend axially beyond the upper axial end of recess 8, and each closure member portion includes a projection 4, 4' extending radially outwardly into recess 8. In the embodiment of FIG. 2, each closure member portion 2, 2' extends beyond both axial ends of recess 8. In the closed position of the mold components, both of the above arrangements close recess 8 and form a wall of the die mold, thus preventing entry of synthetic material into recess 8.

The use of either of these embodiments of the die mold of the present invention to produce a fitting is as follows.

The single-piece ring 1, for example employed as a connecting flange, and which may be made of steel or gray cast iron, for example, is joined with the plural closure member portions 2, 2', for example four such portions. The ring 1 thus surrounds the portions 2, 2' and holds them together. There can be hinges between the portions 2, 2', but it must be possible to open the closure member at at least one point around its periphery, and the closure member must include at least wo portions.

The unit including the closure member and the single-piece ring 1 is now inserted into a fixed mold component 3 of the die mold, whereupon a core of the die mold that will define the inner surface of the fitting 5 to be formed is introduced into the closure member. A movable mold component 3' is then moved to close the mold whereupon the position is as shown in FIGS. 1 and 2, and a thermoplastic synthetic material is injected into the mold in a conventional manner to produce the injection molding 5.

After opening of the mold by removal of mold components 3, 3', ring 1 is pushed onto neck portion 9 of the fitting 5. Thus, ring 1 is removed from closure member portions 2, 2', whereupon the closure member may be opened and the injection molding and ring may be removed therefrom. The closure member, or a new closure member, then may be closed by a new ring, after which the above procedure is repeated.

Although the present invention has been described and illustrated with respect to preferred features, it will be understood that various modifications and changes may be made to the specifically described and illustrated features without departing from the scope of the present invention.

We claim:

1. A die mold for injection molding a fitting, said fitting having a longitudinal axis and a flanged end, with a single-piece ring-shaped flange having axially spaced end surfaces nonremovably mounted about the flanged end of the fitting, said die mold including mold components separable along a plane extending parallel to the longitudinal axis of a fitting to be produced and having inner surfaces, said components having therein an annular recess spaced outwardly of said inner surfaces of said components and into which is to be inserted the flange, said recess having axially spaced annular surfaces, and a closure member for closing said recess and for forming with said inner surfaces of said components in a closed position thereof inner mold surfaces to define outer surfaces of the fitting, said closure member being divided circumferentially thereof into plural portions, the improvement wherein:
   said recess is dimensioned such that at least one end surface of the flange abuts a respective said annular surface of said recess; and
   each said closure member portion is of unitary and single-piece construction in a direction parallel to said longitudinal axis and extends in said direction beyond said respective annular surface of said recess.

2. In a die mold as claimed in claim 1, wherein said closure member portions extend axially beyond both said annular surfaces of said recess.

3. In a die mold as claimed in claim 1, wherein each said closure member portion includes a projection extending radially outwardly into said recess.

* * * * *